US007908432B2

(12) United States Patent
Asano

(10) Patent No.: US 7,908,432 B2
(45) Date of Patent: Mar. 15, 2011

(54) IMAGE PROCESSING APPARATUS WITH MULTIPLE STORAGE DEVICES, AND IMAGE DATA STORING METHOD EXECUTED BY IMAGE PROCESSING APPARATUS

(75) Inventor: Tatsuro Asano, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1189 days.

(21) Appl. No.: 11/546,481

(22) Filed: Oct. 12, 2006

(65) Prior Publication Data

US 2007/0242304 A1 Oct. 18, 2007

(30) Foreign Application Priority Data

Apr. 18, 2006 (JP) ................................ 2006-114940

(51) Int. Cl.
*G06F 12/00* (2006.01)

(52) U.S. Cl. ................................ 711/112; 711/E12.035

(58) Field of Classification Search ........................ None
See application file for complete search history.

(56) References Cited

U.S. PATENT DOCUMENTS

| | | | | |
|---|---|---|---|---|
| 6,972,774 | B2 * | 12/2005 | Eguchi | 345/629 |
| 2002/0034379 | A1 * | 3/2002 | Tanaka | 386/125 |
| 2008/0126686 | A1 * | 5/2008 | Sokolov et al. | 711/103 |

FOREIGN PATENT DOCUMENTS

| | | | |
|---|---|---|---|
| JP | 5-313973 | A | 11/1993 |
| JP | 06-274251 | | 9/1994 |
| JP | 11-187227 | | 7/1999 |
| JP | H11-187227 | A | 7/1999 |
| JP | 2004-208019 | | 7/2004 |
| JP | 2004-254079 | | 9/2004 |
| JP | 2005-63591 | A | 3/2005 |
| WO | WO 2005055226 | A1 * | 6/2005 |

OTHER PUBLICATIONS

Notice of Ground of Rejection in JP 2006-114940 dated Apr. 15, 2008, and Translations thereof.
Notice of Allowance in JP 2006-114940 dated Jul. 8, 2008, and English Translation thereof.

* cited by examiner

*Primary Examiner* — Reginald G Bragdon
*Assistant Examiner* — Aracelis Ruiz
(74) *Attorney, Agent, or Firm* — Buchanan Ingersoll & Rooney PC

(57) ABSTRACT

To reduce power consumption, an MFP includes first to third HDDs of different storage capacities to store data, a writing portion to write received data to one of the first to third HDDs, a mode switching portion to change operating modes including the normal, stand-by, and sleep operating modes, each mode being driven by a different load, and a controller to control driving of the first to third HDDs. The controller includes a selecting portion to select one HDD from the first to third HDDs, which is predetermined in correspondence to the switched operating mode, and a drive controlling portion to drive the selected HDD, while suspending any HDD in operation other than the driven HDD.

14 Claims, 9 Drawing Sheets

F I G. 1
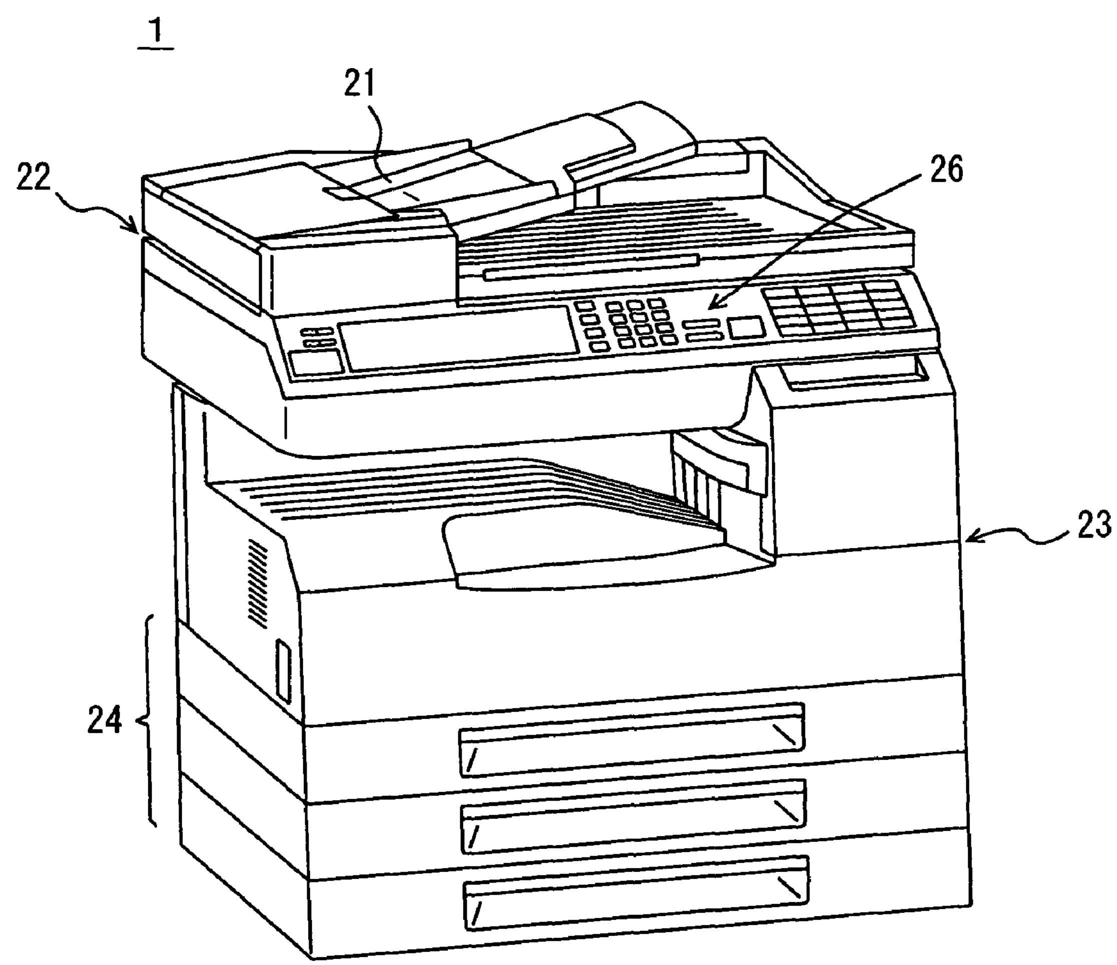

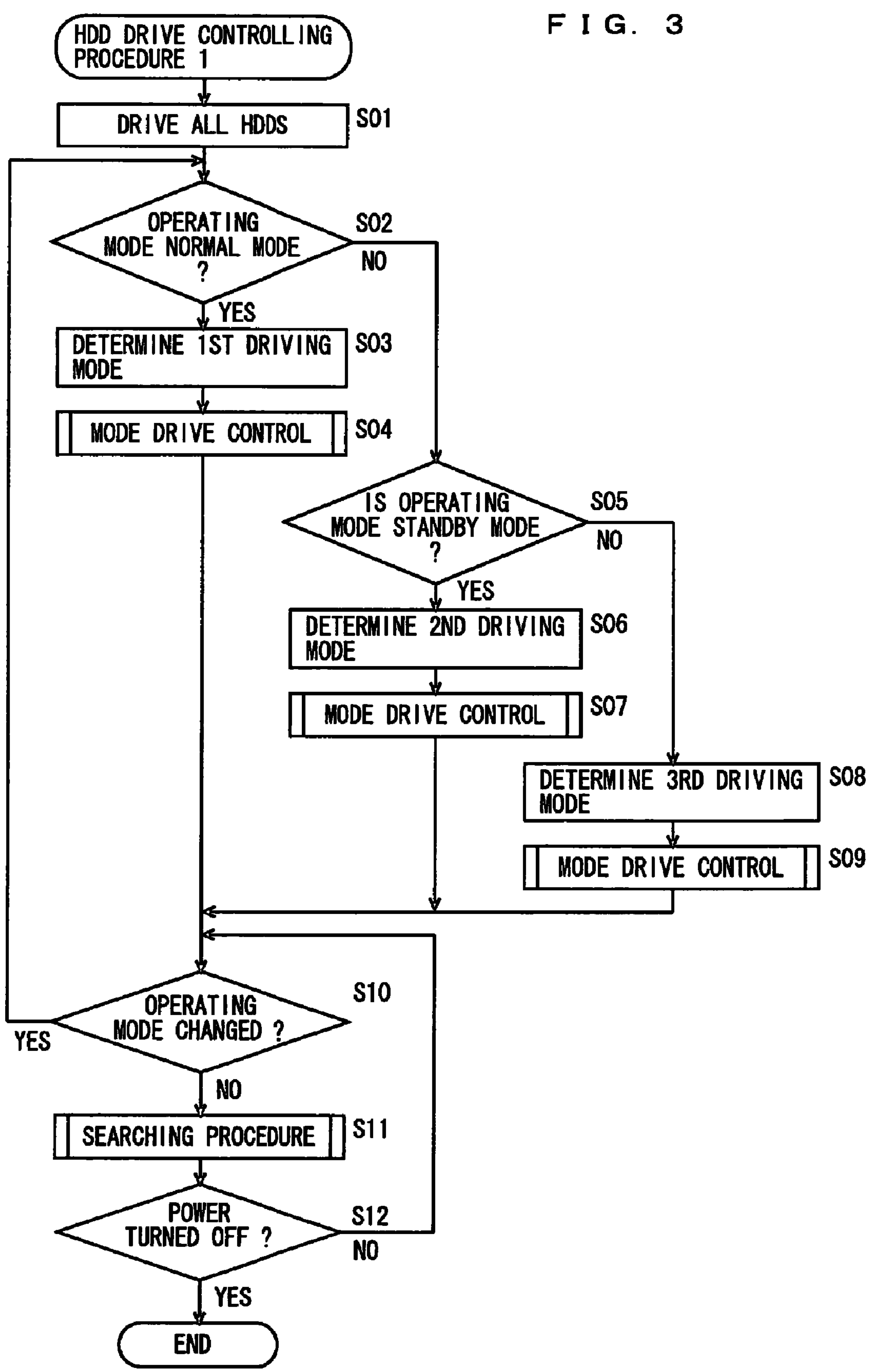
F I G. 3
HDD DRIVE CONTROLLING PROCEDURE 1
DRIVE ALL HDDS
S01
OPERATING MODE NORMAL MODE ?
S02
NO
YES
DETERMINE 1ST DRIVING MODE
S03
MODE DRIVE CONTROL
S04
IS OPERATING MODE STANDBY MODE ?
S05
NO
YES
DETERMINE 2ND DRIVING MODE
S06
MODE DRIVE CONTROL
S07
DETERMINE 3RD DRIVING MODE
S08
MODE DRIVE CONTROL
S09
OPERATING MODE CHANGED ?
S10
YES
NO
SEARCHING PROCEDURE
S11
POWER TURNED OFF ?
S12
NO
YES
END

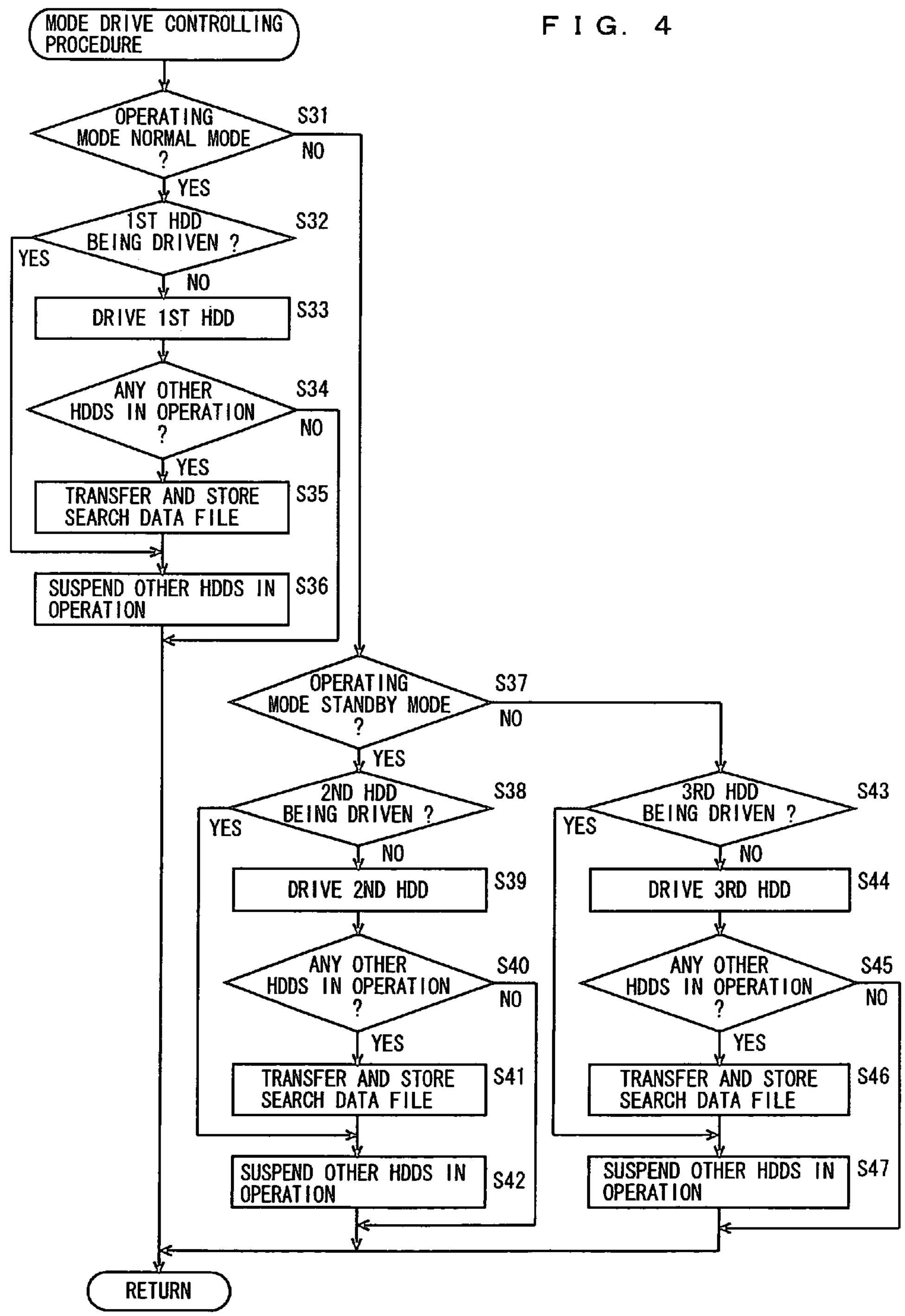
F I G. 4
MODE DRIVE CONTROLLING PROCEDURE
OPERATING MODE NORMAL MODE ?
S31
NO
YES
1ST HDD BEING DRIVEN ?
S32
YES
NO
DRIVE 1ST HDD
S33
ANY OTHER HDDS IN OPERATION ?
S34
NO
YES
TRANSFER AND STORE SEARCH DATA FILE
S35
SUSPEND OTHER HDDS IN OPERATION
S36
OPERATING MODE STANDBY MODE ?
S37
NO
YES
2ND HDD BEING DRIVEN ?
S38
YES
NO
DRIVE 2ND HDD
S39
ANY OTHER HDDS IN OPERATION ?
S40
NO
YES
TRANSFER AND STORE SEARCH DATA FILE
S41
SUSPEND OTHER HDDS IN OPERATION
S42
3RD HDD BEING DRIVEN ?
S43
YES
NO
DRIVE 3RD HDD
S44
ANY OTHER HDDS IN OPERATION ?
S45
NO
YES
TRANSFER AND STORE SEARCH DATA FILE
S46
SUSPEND OTHER HDDS IN OPERATION
S47
RETURN

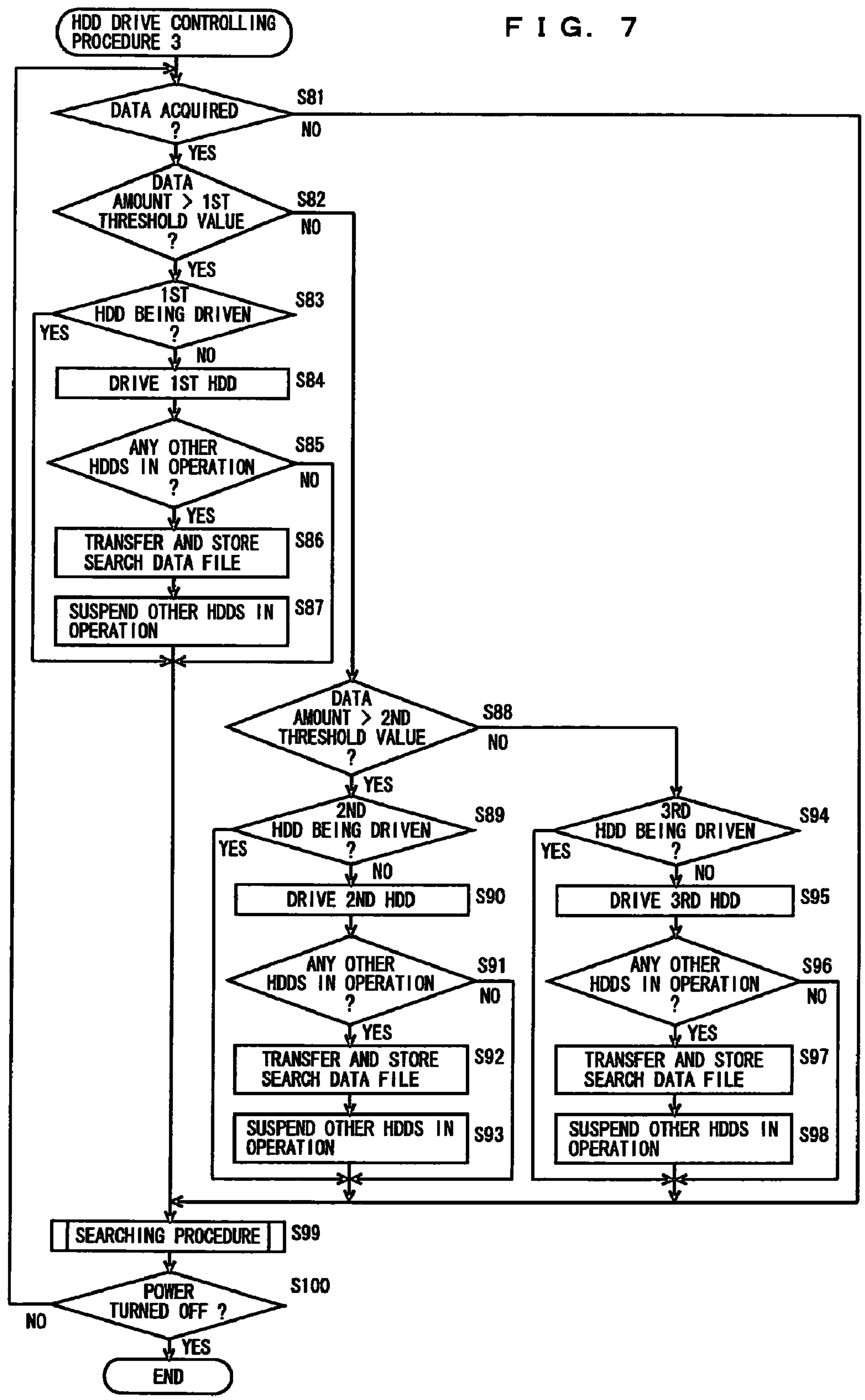
FIG. 7
HDD DRIVE CONTROLLING PROCEDURE 3
DATA ACQUIRED ?
S81
NO
YES
DATA AMOUNT > 1ST THRESHOLD VALUE ?
S82
NO
YES
1ST HDD BEING DRIVEN ?
S83
YES
NO
DRIVE 1ST HDD
S84
ANY OTHER HDDS IN OPERATION ?
S85
NO
YES
TRANSFER AND STORE SEARCH DATA FILE
S86
SUSPEND OTHER HDDS IN OPERATION
S87
DATA AMOUNT > 2ND THRESHOLD VALUE ?
S88
NO
YES
2ND HDD BEING DRIVEN ?
S89
YES
NO
DRIVE 2ND HDD
S90
ANY OTHER HDDS IN OPERATION ?
S91
NO
YES
TRANSFER AND STORE SEARCH DATA FILE
S92
SUSPEND OTHER HDDS IN OPERATION
S93
3RD HDD BEING DRIVEN ?
S94
YES
NO
DRIVE 3RD HDD
S95
ANY OTHER HDDS IN OPERATION ?
S96
NO
YES
TRANSFER AND STORE SEARCH DATA FILE
S97
SUSPEND OTHER HDDS IN OPERATION
S98
SEARCHING PROCEDURE
S99
POWER TURNED OFF ?
S100
NO
YES
END F I G. 8
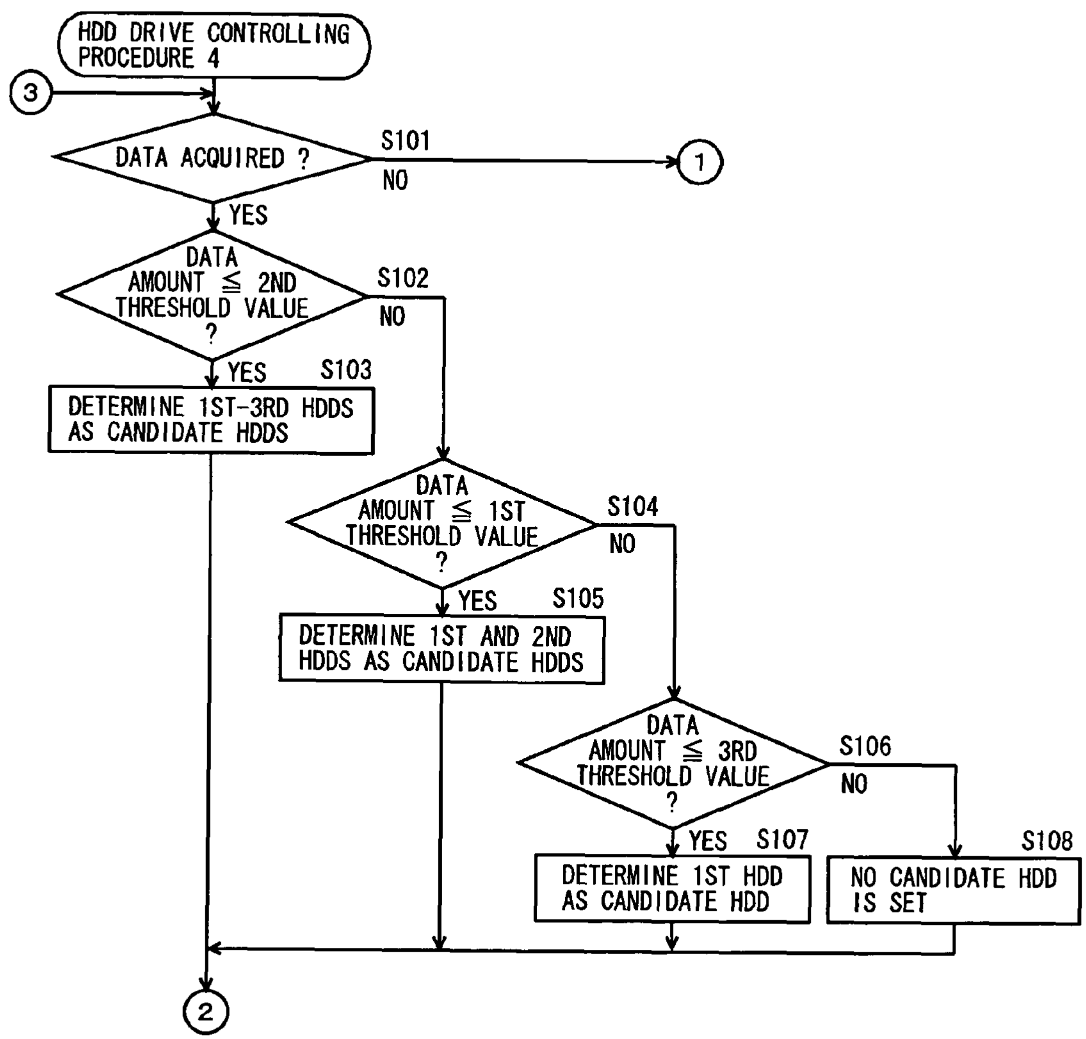

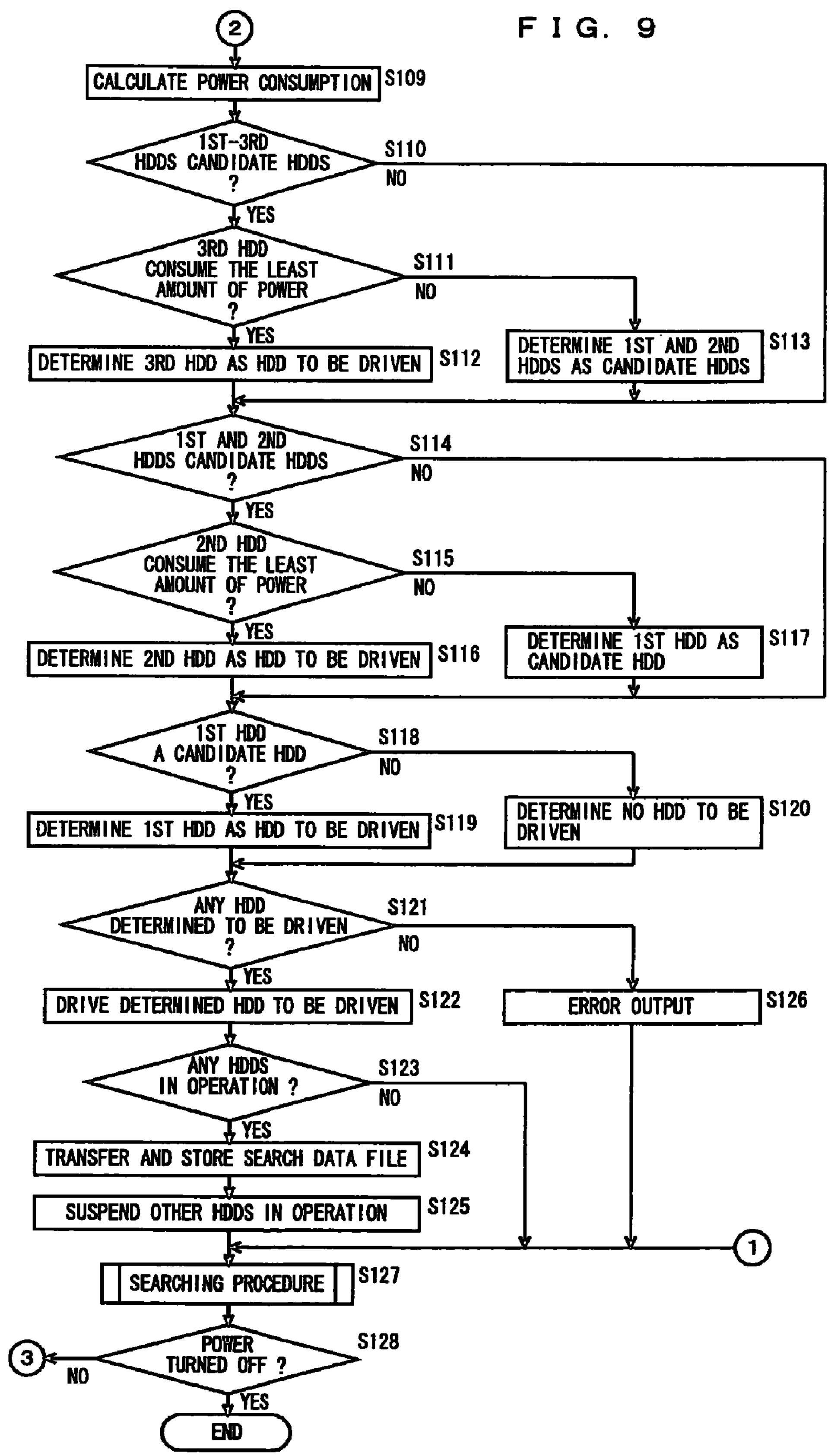
F I G. 9
2
CALCULATE POWER CONSUMPTION
S109
1ST-3RD HDDS CANDIDATE HDDS ?
S110
NO
YES
3RD HDD CONSUME THE LEAST AMOUNT OF POWER ?
S111
NO
YES
DETERMINE 3RD HDD AS HDD TO BE DRIVEN
S112
DETERMINE 1ST AND 2ND HDDS AS CANDIDATE HDDS
S113
1ST AND 2ND HDDS CANDIDATE HDDS ?
S114
NO
YES
2ND HDD CONSUME THE LEAST AMOUNT OF POWER ?
S115
NO
YES
DETERMINE 2ND HDD AS HDD TO BE DRIVEN
S116
DETERMINE 1ST HDD AS CANDIDATE HDD
S117
1ST HDD A CANDIDATE HDD ?
S118
NO
YES
DETERMINE 1ST HDD AS HDD TO BE DRIVEN
S119
DETERMINE NO HDD TO BE DRIVEN
S120
ANY HDD DETERMINED TO BE DRIVEN ?
S121
NO
YES
DRIVE DETERMINED HDD TO BE DRIVEN
S122
ERROR OUTPUT
S126
ANY HDDS IN OPERATION ?
S123
NO
YES
TRANSFER AND STORE SEARCH DATA FILE
S124
SUSPEND OTHER HDDS IN OPERATION
S125
1
SEARCHING PROCEDURE
S127
POWER TURNED OFF ?
S128
3
NO
YES
END

IMAGE PROCESSING APPARATUS WITH MULTIPLE STORAGE DEVICES, AND IMAGE DATA STORING METHOD EXECUTED BY IMAGE PROCESSING APPARATUS

This application is based on Japanese Patent Application No. 2006-114940 filed with Japan Patent Office on Apr. 18, 2006, the entire content of which is hereby incorporated by reference.

BACKGROUND OF THE INVENTION

1. Field of the Invention

The present invention relates to an image processing apparatus and an image data storing method. More particularly, the present invention relates to an image processing apparatus with multiple storage devices and an image data storing method executed by the image processing apparatus.

2. Description of the Related Art

Recently, a certain type of image forming apparatus, such as the one represented by an MFP (Multi Function Peripheral) which has multiple functions including faxing (i.e., transmitting/receiving a facsimile), printing, scanning, copying, and so on, is arising in the commercial market. The MFP includes a HDD (hard disc drive), a large capacity storage device for storing image data to be handled by the MFP.

Each of the faxing, printing, scanning and copying functions processes a different size of image data. For example, the scan data to be processed in the scanning function generally has a larger amount of data, compared to the facsimile data to be processed in the faxing function. If the MFP has a single large capacity HDD, it will always be driven, regardless of which function being mainly used, even when the function processes only a small amount of data. Thus, the large HDD must be driven, although the power consumption of the HDD soars as the size of the HDD increases, which requires unnecessarily large power consumption.

SUMMARY OF THE INVENTION

The present invention has been made to solve the problem set forth above, and one object of the present invention is to provide an image processing apparatus capable of reducing power consumption.

Another object of the present invention is to provide an image processing method capable of reducing power consumption.

To achieve the above objects, according to one aspect of the present invention, an image processing apparatus includes a plurality of storage devices to store data, each storage device having a different storage capacity, a writing unit to write received data to one of the plurality of storage devices, an operating mode switching unit to change one operating mode for another operating mode among a plurality of operating modes, each mode being driven by a different load, and a controller to control driving each of the plurality of storage devices. The controller includes a selecting unit to select one storage device from the plurality of storage devices, the one storage device being predetermined in correspondence to the switched operating mode, and a drive controlling unit to drive the selected storage device, while suspending any storage device in operation other than the driven storage device.

In this aspect, when the operating mode is changed for another operating mode of the plurality of operating modes, each driven by a different load, one storage device which is predetermined corresponding to the switched operating mode is selected and driven to write the received data there. As the data is stored in one storage device which is predetermined corresponding to each of the plurality of operating modes, it is possible to reduce the power consumption by driving a storage device having, for example, a small storage capacity corresponding to the operating mode that handles a small amount of data, instead of driving a storage device having a large storage capacity. As a result, an image processing apparatus capable of reducing the power consumption can be provided.

According to another aspect of the present invention, an image processing apparatus has a plurality of functions, and includes a plurality of storage devices to store data, each storage device being provided corresponding to each of the plurality of functions, and a controller to control driving each of the plurality of storage devices. When one of the plurality of functions is enabled, one storage device corresponding to the enabled function is driven, while suspending any storage device in operation other than the driven storage device.

In this aspect, in response to any one of the plurality of functions being enabled, one storage device of the plurality of storage devices corresponding to the enabled function is driven, while suspending any storage device in operation other than the driven storage device. As the data is stored in one storage device which is predetermined corresponding to each of the plurality of functions, it is possible to reduce the power consumption by driving a storage device having, for example, a small storage capacity corresponding to the function that handles a small amount of data, instead of driving a storage device having a large storage capacity. As a result, an image processing apparatus capable of reducing the power consumption can be provided.

According to still another aspect of the present invention, an image forming apparatus includes a plurality of storage devices to store data, each storage device having a different storage capacity, a writing unit to write received data to one of the plurality of storage devices, a data acquiring unit to acquire data, and a controller to control driving each of the plurality of storage devices. The controller includes a selecting unit to select one storage device from the plurality of storage devices according to the data amount of acquired data, when the data is acquired by the data acquiring unit, and a drive controlling unit to drive the selected storage device, while suspending any storage device in operation other than the driven storage device.

In this aspect, when the data is acquired, one storage device is selected from the plurality of storage devices, each having a different storage capacity, according to the data amount of the acquired data, and the selected storage device is driven to write the received data. As the data is stored in one storage device which is determined according to the received data amount, it is possible to reduce the power consumption by driving a storage device having, for example, a small storage capacity corresponding to the operating mode that handles a small amount of data, instead of driving a storage device having a large storage capacity. As a result, an image processing apparatus capable of reducing the power consumption can be provided.

According to still another aspect of the present invention, an image processing apparatus includes a plurality of storage devices to store data, each storage device having a different storage capacity, a writing unit to write received data to one of the plurality of storage devices, a data acquiring unit to acquire data, a controller to control driving each of the plurality of storage devices, and a power consumption calculating unit which calculates a power consumption needed for each of said plurality of storage devices to store the acquired data. The controller includes a selecting unit to select one storage device from the plurality of storage devices according to the power consumption calculated by the power consumption calculating unit when the data is acquired by the data acquiring unit, and a drive controlling unit to drive the selected storage device, while suspending any storage device in operation other than the driven storage device.

In this aspect, when any of the plurality of the storage devices is in operation, a power consumption needed to store the acquired data is calculated for each of the plurality of storage devices, and a storage device having the least power consumption is driven to allow minimizing the power consumption. As a result, an image processing apparatus capable of reducing the power consumption can be provided.

According to still another aspect of the present invention, an image data storing method is executed by an image processing apparatus which includes a plurality of storage devices to store data, each storage device having a different storage capacity. The method includes the steps of writing received data to one of the plurality of storage devices, changing one operating mode for another operating mode among a plurality of operating modes, each operating mode being driven by a different load, controlling driving each of the plurality of storage devices, selecting one storage device which is predetermined corresponding to the switched operating mode, driving the selected storage device, and suspending any storage device in operation other than the driven storage device.

In this aspect, a method of storing image data with reduced power consumption can be provided.

According to still another aspect of the present invention, an image data storing method is executed in an image processing apparatus having a plurality of storage devices to store data. The method includes the steps of enabling one of a plurality of functions, driving, in response to the one of the plurality of functions being enabled, a storage device among the plurality of storage devices, corresponding to the enabled function, and suspending any storage device in operation other than the driven storage device.

In this respect, a method of storing image data with reduced power consumption can be provided.

According to still another aspect of the present invention, an image data storing method is executed by an image processing apparatus which includes a plurality of storage devices to store data, each storage device having a different storage capacity. The method includes the steps of acquiring data, selecting, in response to the data being acquired in the data acquiring step, one storage device from the plurality of storage devices according to the data amount of the acquired data, driving the selected storage device, and suspending any storage device in operation other than the driven storage device.

In this aspect, a method of storing image data with reduced power consumption can be provided.

According to still another aspect of the present invention, an image data storing method is executed by an image processing apparatus which includes a plurality of storage devices to store data, each storage device having a different storage capacity. The method includes the steps of acquiring data, calculating, in response to the data being acquired in the data acquiring step, a power consumption needed for each of the plurality of storage devices to store the acquired data, selecting one storage device from the plurality of storage devices according to the power consumption calculated in the power consumption calculating step, driving the selected storage device, suspending any storage device in operation other than the driven storage device, and writing the data acquired in the data acquiring step to the driven storage device.

In this aspect, a method of storing image data with reduced power consumption can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view showing an appearance of an MFP;

FIG. 3 is a flow chart illustrating an example of a HDD drive controlling procedure;

FIG. 4 is a flow chart illustrating an example of a mode drive controlling procedure;

FIG. 7 is a flow chart illustrating a third example of the HDD drive controlling procedure; and FIGS. 8 and 9 are flow charts illustrating a fourth example of the HDD drive controlling procedure.

DESCRIPTION OF THE PREFERRED EMBODIMENTS

Figure 2:
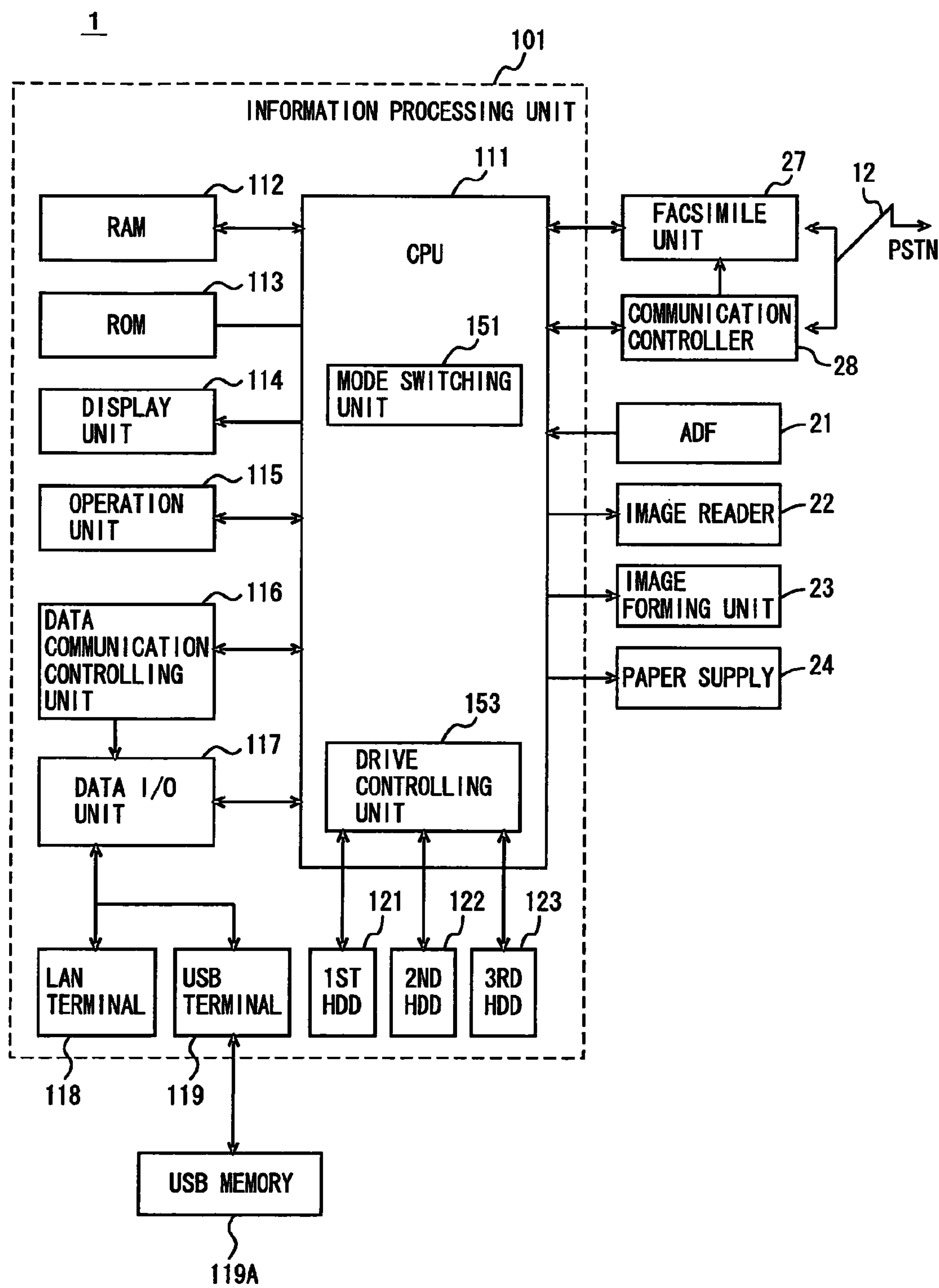
FIG. 2 is a block diagram illustrating an example of a hardware structure of the MFP.

The present invention will be described below with reference to the accompanying drawings. In the drawings, like numerals indicate similar elements which are designated the same way and perform the same function, and the detailed description thereof will not be repeated.

Referring to FIG. 1, there is shown a perspective view of an MFP (Multi Function Peripheral). As show in FIG. 1, an MFP 1 includes an ADF (automatic document feeder) 21, an image reader 22, an image forming unit 23, and a paper supply 24. ADF 21 handles a plurality of documents mounted on a document tray to transport the documents one after another to image reader 22. Image reader 22 optically reads information of the image, including pictures, letters, drawings, and so on, to acquire image data. Image forming unit 23 receives the image data and forms an image on a recording medium, such as a sheet of paper, according to the image data. Paper supply 24 stores a stock of sheets of paper and supplies them one sheet after another to image forming unit 23. MFP 1 also includes a control panel 26 on the top surface thereof.

FIG. 2 is a block diagram of an exemplary hardware structure of the MFP. As shown in FIG. 2, MFP 1 includes an information processing unit 101, a facsimile unit 27, a communication controller 28, ADF 21, image reader 22, image forming unit 23, and paper supply 24. Information processing unit 101 includes a central processing unit (CPU) 111, a random access memory (RAM) 112 which is used as a working area of CPU 111, a read only memory (ROM) 113 which stores a program or the like to be executed by CPU 111, a display unit 114, an operation unit 115, a data communication controlling unit 116, a data input/output (I/O) unit 117, and first to third hard disc drives (HDDs) 121, 122, and 123 which store data in a nonvolatile manner. CPU 111 is connected to data I/O unit 117, data communication controlling unit 116, operation unit 115, display unit 114, and first to third HDDs 121, 122, and 123, respectively, to control the entire information processing unit 101. CPU 111 is also connected to facsimile unit 27, communication controller 28, ADF 21, image reader 22, image forming unit 23, and paper supply 24 to control the entire MFP 1.

Display unit 114 is implemented by a display device such as a liquid crystal display (LCD) and an organic electroluminescence display (EL), and displays a menu of instructions or the information of acquired image data toward users. Operation unit 115 includes a plurality of keys for entering data including various instructions, letters and numerals by manipulating individual keys by the user. Operation unit 115 also includes a touch panel provided on display unit 114. Display unit 114 and operation unit 115 form control panel 26.

Data communication controlling unit 116 is connected to data I/O unit 117. Data communication controlling unit 116 controls data I/O unit 117 in response to an instruction from CPU 111, and transmits/receives data to and from external devices connected to data I/O unit 117. Data I/O unit 117 includes a LAN terminal 118 and a universal serial bus (USB) terminal 119 which are used to provide communication in accordance with a communication protocol such as a transmission control protocol (TCP) or a file transfer protocol (FTP).

When a LAN cable is connected to LAN terminal 118 in order to connect to a LAN 11, data communication controlling unit 116 controls data I/O unit 117 to communicate with another MFP, printer or computer connected via IAN terminal 118. When a certain device is connected to USB terminal 119, data communication controlling unit 116 controls data I/O unit 117 to communicate with the connected device to input/output data. A USB memory 119A including a built-in flash memory can be connected to USB terminal 119. USB memory 119A previously stores an image data storing program, which will be described later, so that CPU 111 controls data communication controlling unit 116 to read the image data storing program from USB memory 119A, stores it in RAM 112 and executes it.

USB memory 119A is one type of recording medium storing the image data storing program, and other medium capable of bearing the program in a fixed manner, such as a flexible disc, cassette tape, an optical disc, compact disc-read only memory (CD-ROM), magnetic optical disc (MO), mini disc (MD), digital versatile disc (DVD), an IC card (including memory card), an optical card, and a semiconductor memory such as mask ROM, erasable programmable ROM (EPROM), and electronically erasable programmable ROM (EEPROM) may be used. Alternatively, CPU 111 may download the image data storing program from a computer connected to the Internet and stores it in any one of the first to third HDDs 121, 122 and 123, or the computer connected to the Internet may write the data storing program to any one of the first to third HDDs 121, 122 and 123. The image data storing program stored in any one of HDDs 121, 122 and 123 is then loaded to RAM 112 and executed by CPU 111. In the present embodiment, the term "program" includes not only a program executable directly by CPU 111, but also other programs such as source-type programs, compressed programs and encrypted programs.

Communication controller 28 is a modem to connect CPU 111 to PSTN 12. MFP 1 has a telephone number which is previously allocated in PSTN 12. When the telephone number allocated to MFP 1 is called from the fax machine connected to PSTN 12, communication controller 28 detects the incoming call. Upon detecting the incoming call, communication controller 28 establishes the call and allows communication via facsimile unit 27.

Facsimile unit 27 is connected to PSTN 12 and transmits and/or receives facsimile data to and from PSTN 12. Facsimile unit 27 supplies the received facsimile data to image forming unit 23 after converting it into print data which is printable in image forming unit 23. In response, image forming unit 23 prints the facsimile data received from facsimile unit 27 on a recording sheet, or stores it in any of the first to third HDDs 121, 122 and 123. Facsimile unit 27 also converts the data stored in any one of the first to third HDDs 121, 122, and 123 into facsimile data and transmits it to a fax machine or another MFP connected to PSTN 12. In this way, it is possible to output the data stored in any one of HDDs 121, 122 and 123 the fax machine or other MFPs. It is noted that the facsimile data is included in the image data.

As described above, MFP 1 has the faxing function. MFP 1 also has a scanner function to allow image reader 22 to read the original, output the image data, and store the output image data in any of the first to third HDDs 121, 122 and 123. In addition, image forming unit 23 forms an image on the recording sheet, such as a sheet of paper, according to the image data output from image reader 22 after reading the original. In this respect, MFP 1 also has a copying function. Further, image forming portion 23 forms an image on the recording sheet, such as a sheet of paper, according to the image data received by data I/O unit 117 from other computers connected to the LAN. In this respect, MFP 1 has a printing function.

CPU 111 includes a mode changing unit 151 and a drive controlling unit 153. Mode changing unit 151 changes the operating mode of MFP 1 for another operating mode of a plurality of operating modes. The plurality of operating modes include a normal mode, a stand-by mode, and a sleep mode. When mode changing unit 151 changes the operating mode, MFP 1 is set in the selected operating mode. If mode changing unit 151 changes the operating mode to select the normal mode, MFP 1 will be set in the normal mode where the electric power is supplied to every load to allow immediate execution of faxing, printing, scanning, and copying functions. If mode changing unit 151 changes the operating mode to select the stand-by mode, MFP 1 will be set in the stand-by mode where the power supply to several loads is shut off or the power supply is generally reduced. If mode changing unit 151 changes the operating mode to select the sleep mode, MFP 1 will be set in the sleep mode where the electric power is only supplied to the loads that are determined necessary to sustain the operation, such as CPU 111 and communication controller 28. When the stand-by mode is set, MFP 1 shuts off the power supply to, for example, display unit 114. In the meantime, image forming unit 23 includes fixing rollers to fix toner images on the recording medium. When MFP 1 is set in the normal mode, it supplies power necessary for the fixing rollers to maintain a predetermined temperature. However, if MFP 1 is set in the stand-by mode, it supplies power necessary for the fixing rollers to maintain a temperature lower than the predetermined temperature. Further, if the MFP is set in the sleep mode, it shuts off the power supply to the fixing rollers. As the amount of electric power to be supplied is varied for each operating mode, the power consumption of MFP 1 also varies from the maximum amount in the normal mode, followed by the stand-by mode, and the sleep mode that consumes the least amount of power.

Drive controlling unit 153 controls the driving of each of the first to third HDDs 121, 122 and 123. The first to third HDDs 121, 122 and 123 each have different storage capacities. The first HDD 121 has the largest storage capacity, the second HDD 122 has the second largest storage capacity, and the third HDD 123 has the smallest storage capacity. In terms of power consumption, the first HDD 121 consumes the largest amount of power, the second HDD 122 consumes the second largest amount of power, and the third HDD 123 consumes the smallest amount of power. In this embodiment, the first HDD 121 has a 3.5 inch disc with the storage capacity of 500 GB (gigabyte), the second HDD 122 has a 2.5 inch disc with the storage capacity of 120 GB, and the third HDD 123 has a 1 inch disc with the storage capacity of 8 GB. CPU 111 is able to write the image data to any active HDD among the first to third HDDs 121, 122 and 123.

Referring to FIG. 3, there is shown a flow chart illustrating an exemplary HDD driving procedure. The HDD driving procedure is a process executed by CPU 111 by running the image data storing program in CPU 111. The HDD driving procedure is also a process executed by CPU 111 upon turning on of the power supply switch of MFP 1 to supply power. MFP 1 runs in three types of operating modes, including the normal mode, the stand-by mode, and the sleep mode, in terms of energy saving, and is controlled to change operating modes as needed according to the frequency of using individual functions.

CPU 111 firstly drives all of the first to third HDDs 121, 122 and 123 (step S01). All of the first to third HDDs 121, 122 and 123 are driven because it is necessary to do maintenance of the search data stored in the first to third HDDs 121, 122 and 123, respectively. In step S02, it is determined whether or not the operating mode is the normal mode. If the operating mode is the normal mode, the process proceeds to step S03. If the operating mode is not the normal mode, the process proceeds to step S05. In step S03, a first operating mode is determined. The first operating mode makes the first HDD 121 drive, while suspending the second and third HDDs 122 and 123. In step S04, a mode drive controlling procedure is executed, which will be described later. Then, the process proceeds to step S10.

In step S05, it is determined whether or not the operating mode is the stand-by mode. If the operating mode is the stand-by mode, the process proceeds to step S06. If the operating mode is not the stand-by mode, the process proceeds to step S08. In step S06, a second driving mode is determined. The second driving mode makes the second HDD 122 drive, while suspending the first and third HDDs 121 and 123. Then, a mode drive controlling procedure is executed (step S07), and the process proceeds to step S10.

When the process proceeds to step S08, the operating mode is the sleep mode. The sleep mode is determined as a third operating mode (step S08). The third operating mode makes the third HDD 123 drive, while suspending the first and second HDDs 121 and 122. Then, a mode drive controlling process is executed (step S09), and the process proceeds to step S10.

In step S10, it is determined whether or not the operating mode has been changed. If the operating mode has been changed, the process returns to step S02, otherwise the process proceeds to step S11. In step S11, a searching procedure is executed and the process proceeds to step S12. The searching procedure will be described later. In step S12, it is determined whether or not the power supply of MFP 1 is turned off. When the power supply is turned off, the process ends, otherwise the process returns to step S10.

As described above, when MFP 1 switches to the energy saving setting while it is in the normal operating mode, only the first HDD 121 among the first to third HDDs 121, 122 and 123 is driven. If MFP 1 is in the stand-by mode, only the second HDD 122 among the first to third HDDs 121, 122 and 123 is driven. If MFP 1 is in the sleep mode, only the third HDD 123 among the first to third HDDs 121, 122 and 123 is driven. As the second HDD 122, that consumes less power than the first HDD 121 to be driven in the normal mode, will be driven in the stand-by mode, it is possible to reduce the power consumption. In addition, as the third HDD 123, that consumes yet less power than the second HDD 122 to be driven in the stand-by mode, will be driven in the sleep mode, it is also possible to further reduce the power consumption.

Referring to FIG. 4, there is shown a flow chart illustrating an exemplary mode drive controlling procedure. The mode drive controlling procedure is a process executed in steps S04, S07 and S09 of FIG. 3. As shown in FIG. 4, CPU 111 determines whether or not the current operating mode is the normal mode (step S31). If the operating mode is the normal mode, the process proceeds to step S32. If the operating mode is not the normal mode, the process proceeds to step S37. In step S32, it is determined whether or not the first HDD 121 is in operation. If the first HDD 121 is in operation, the process ends. If the first HDD 121 is not in operation, the process proceeds to step S33. In step S33, the first HDD is driven. Subsequently, it is determined whether or not other HDDs, i.e., the second HDD 122 and/or the third HDD 123, are in operation (step S34). If either the second or third HDD 122, 123 is in operation, the process proceeds to step S35. If neither the second nor third HDD 122, 123 is in operation, the process ends. In step S35, a search data file stored in either the second or third HDD 122, 123 that is in operation is transferred to and stored in the first HDD 121. The search data file transferred to the first HDD 121 includes the search data file to search through the data stored in the second and third HDDs 122 and 123, respectively. Subsequently, either the second or third HDD 122, 123 that is in operation is suspended (step S36). As a result, only the first HDD 121 is in operation.

In step S37, it is determined whether or not the operating mode is the stand-by mode. If the operating mode is the stand-by mode, the process proceeds to step S38. If the operating mode is not the stand-by mode, the process proceeds to step S43. In step S38, it is determined whether or not the second HDD 122 is in operation. If the second HDD 122 is in operation, the process ends. If the second HDD 122 is not in operation, the process proceeds to step S39. In step S39, the second HDD 122 is driven. Subsequently, it is determined whether or not other HDDs, i.e., the first HDD 121 and/or the third HDD 123, are in operation (step S40). If either the first or third HDD 121, 123 is in operation, the process proceeds to step S41. If neither the first nor third HDD 121, 123 is in operation, the process ends. In step S41, a search data file stored in either the first or third HDD 121, 123 that is in operation is transferred to and stored in the second HDD 122. The search data file transferred to the second HDD 122 includes the search data file to search through the data stored in the first and third HDDs 121 and 123, respectively. Subsequently, either the first or third HDD 121, 123 that is in operation is suspended (step S42). As a result, only the second HDD 122 is in operation.

The process proceeds to step S43 when the operating mode is the sleep mode. In step S43, it is determined whether or not the third HDD 123 is in operation. If the third HDD 123 is in operation, the process ends. If the third HDD 123 is not in operation, the process proceeds to step S44. In step S44, the third HDD 123 is driven. Subsequently, it is determined whether or not other HDDs, i.e., the first HDD 121 and/or the second HDD 122, are in operation (step S45). If either the first or second HDD 121, 122 is in operation, the process proceeds to step S46. If neither the first nor second HDD 121, 122 is in operation, the process ends. In step S46, a search data file stored in either the first or second HDD 121, 122 that is in operation is transferred to and stored in the third HDD 123. The search data file transferred to the third HDD 123 includes the search data file to search the data stored in the first and second HDDs 121 and 122, respectively. Subsequently, either the first or second HDD 121, 122 that is in operation is suspended (step S47). As a result, only the third HDD 123 is in operation.

As such, when the operating mode is changed, MFP 1 drives one of the first to third HDDs 121, 122 and 123 according to the switched operating mode. Before suspending any HDD that was in operation till the operating mode is changed, the search data file that has been previously stored in the any HDD in operation among the first to third HDDs 121, 122 and 123 is transferred to and stored in another HDD to be driven after changing the operating mode. With the search data file stored in the HDD that is currently in operation after changing the operating mode, it is still possible to search through the data previously stored in any suspended HDD after changing the operating mode, although only one HDD will be driven after changing the operating mode.

Figure 5:
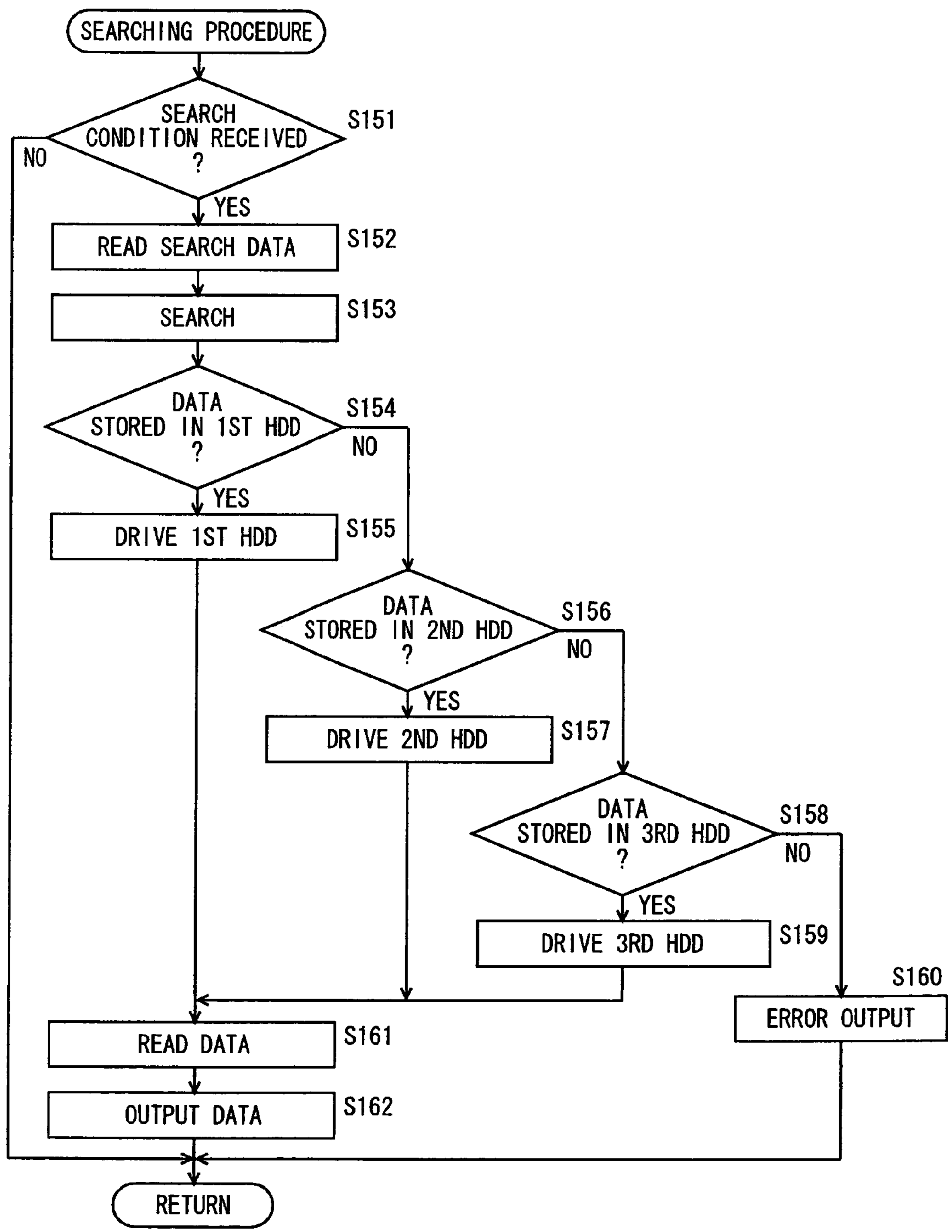
FIG. 5 is a flow chart illustrating an example of a searching procedure.

Referring to FIG. 5, there is shown a flow chart illustrating an exemplary searching procedure. The searching procedure is a process executed in step S11 of FIG. 3, step S99 of FIG. 7, and step S127 of FIG. 9. As shown in FIG. 5, CPU 111 determines whether or not a search condition is received (step S151). If the user manipulates operation unit 115 to enter the search condition, CPU 111 receives the search condition entered via operation unit 115. If the search condition is received, the process proceeds to step S152. If the search condition is not received, the process returns to the previous routine. In step S152, the search data stored in any HDD in operation among the first to third HDDs 121, 122 and 123 is read. As mentioned above, the HDD that is currently in operation stores the search data file to search through the data stored in the first to third HDDs 121, 122 and 123, respectively.

Subsequently, CPU 111 searches using the search data file read in step S152 according to the search condition received in step S151 (step S153). As a result, a particular HDD which stores the data corresponding to the search condition is identified among the fist to third HDDs 121, 122 and 123.

In step S154, it is determined whether or not the data corresponding to the search condition is stored in the first HDD 121. If the data is stored in the first HDD 121, the process proceeds to step S155, otherwise the process proceeds to step S156. In step S155, the first HDD 121 is driven. It is noted that if the first HDD 121 has been already driven, step S155 will be skipped.

In step S156, it is determined whether or not the data corresponding to the search condition is stored in the second HDD 122. If the data is stored in the second HDD 122, the process proceeds to step S157, otherwise the process proceeds to step S158. In step S157, the second HDD 122 is driven. It is noted that if the second HDD 122 has been already driven, step S157 will be skipped.

In step S158, it is determined whether or not the data corresponding to the search condition is stored in the third HDD 123. If the data is stored in the third HDD 123, the process proceeds to step S159, otherwise the process proceeds to step S160. In step S159, the third HDD 123 is driven. It is noted that if the third HDD 123 has been already driven, step S159 will be skipped. In step S160, an error is output. For example, error messages, such as "No Data Corresponding to the Search Condition is Stored", are displayed on display unit 114.

Subsequently, the data corresponding to the search condition is read from the HDD that has been driven in step S155, S157 or S159, and the data is output (step S162). The data may be output in compliance with the user's instructions entered via operation unit 115. For example, if forming the image has been instructed, the data is output to data I/O unit 117 to transmit it to the designated destination.

First Modified Embodiment

In contrast to MFP 1 of the above-described embodiment, where a single HDD is driven among the first to third HDDs 121, 122 and 123 corresponding to the operating mode of MFP 1, an MFP 1 of a first modified embodiment drives a single HDD which is predetermined corresponding to a particular function to process image data.

Figure 6:
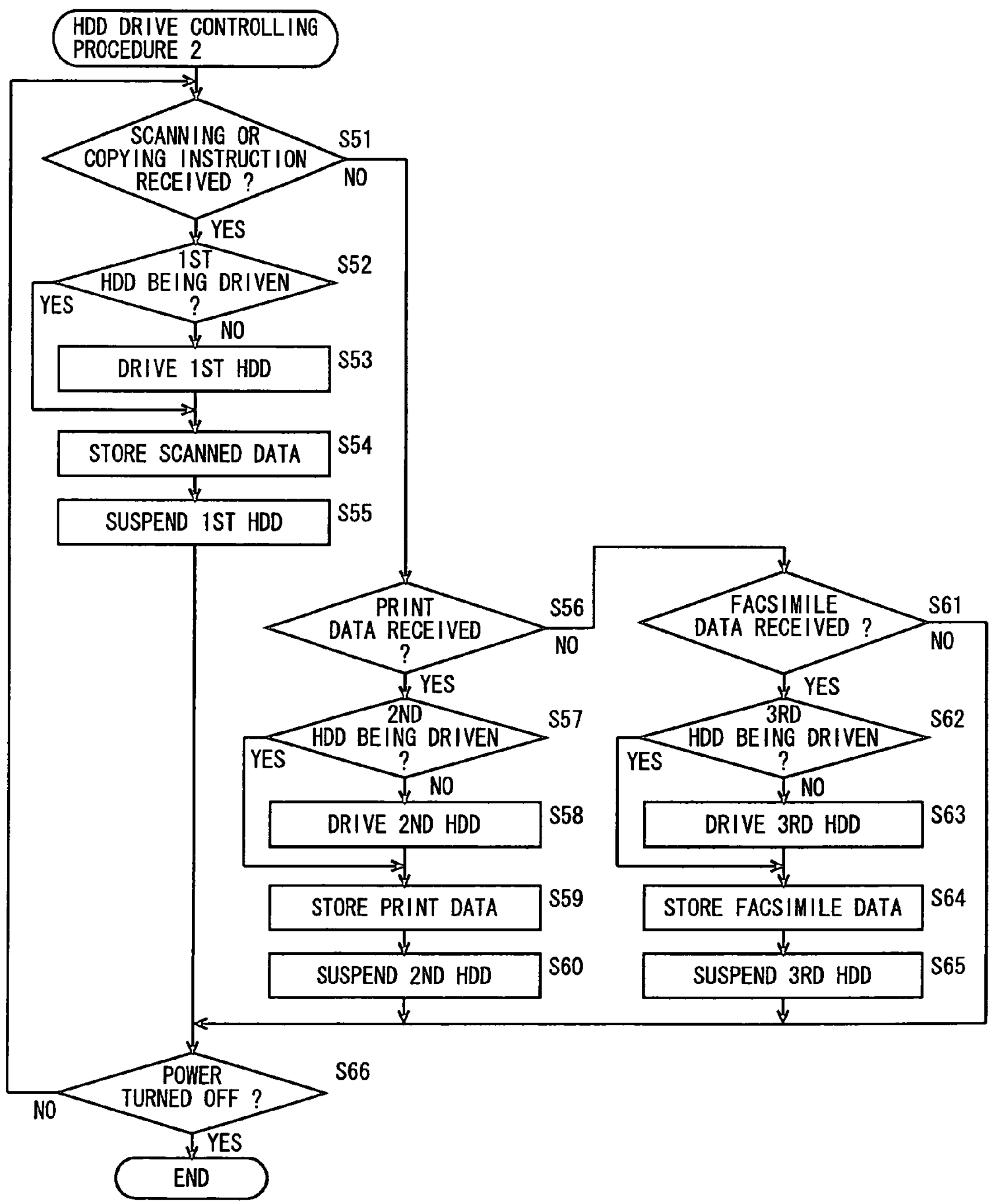
FIG. 6 is a flow chart illustrating a second example of the HDD drive controlling procedure.

Referring to FIG. 6, there is shown a second flow chart illustrating an exemplary HDD drive controlling procedure. As shown in FIG. 6, CPU 111 determines whether or not a scanning or copying instruction is received (step S51). If either the scanning or copying instruction is received, the process proceeds to step S52. If neither instruction is received, the process proceeds to step S56. In step S52, it is determined whether or not the first HDD 121 is in operation. If the first HDD 121 is not in operation, the process proceeds to step S53. If the first HDD 121 is in operation, the process proceeds to step S54. In step S53, the first HDD 121 is driven and the process proceeds to step S54. As the scanning or copying function has bee enabled by receiving the scanning or copying instruction in step S51, the image data (scanned data), that was read by and output from image reader 22, is stored in the first HDD 121. In the next step S55, the first HDD 121 is suspended. When the scanning or copying instruction is received, the first HDD 121 is driven and stores the scanned data, but once the scanned data is stored, the first HDD 121 is suspended. Therefore, it is possible to reduce the power consumption. Subsequently, the process proceeds to step S66. In step S66, it is determined whether or not MFP 1 is turned off. If the power is turned off, the process ends, otherwise the process returns to step S51.

In step S56, it is determined whether or not the print data is received. If the print data is received, the process proceeds to step S57. If the print data is not received, the process proceeds to step S61. In step S57, it is determined whether or not the second HDD 122 is in operation. If the second HDD 122 is not in operation, the process proceeds to step S58. If the second HDD 122 is in operation, the process proceeds to step S59. As the printing function has been enabled by receiving the print data in step S56, the print data received in step S56 is stored in the second HDD 122 in step S59. In the next step S60, the second HDD 122 is suspended. When the print data is received, the second HDD 122 is driven and stores the print data, but once the print data is stored, the second HDD 122 is suspended. Therefore, it is possible to reduce the power consumption. Subsequently, the process proceeds to step S66.

In step S61, it is determined whether or not the facsimile data is acquired. If the facsimile data is acquired, the process proceeds to step S62. If the facsimile data is not acquired, the process proceeds to step S66. Acquiring the facsimile data includes receiving the facsimile data and inputting the facsimile data to be transmitted. In step S62, it is determined whether or not the third HDD 123 is in operation. If the third HDD 123 is not in operation, the process proceeds to step S63. If the third HDD 123 is in operation, the process proceeds to step S64. In step S63, the third HDD 123 is driven and the process proceeds to step S64. As the faxing function has been enabled by acquiring the facsimile data in step S61, the facsimile data acquired in step S61 is stored in the third HDD 123 in step S64. In the next step S65, the third HDD 123 is suspended. When the facsimile data is acquired, the third HDD 123 is driven and stores the facsimile data, but once the facsimile data is stored, the third HDD 123 is suspended. Therefore, it is possible to reduce the power consumption. Subsequently, the process proceeds to step S66.

As described above, MFP 1 of the first modified embodiment associates the first to third HDDs 121, 122 and 123 with the scanning and copying function, the printing function, and the faxing function, respectively. When the scanning or copying function is enabled, only the first HDD 121 is driven. When the printing function is enabled, only the second HDD 122 is driven. When the faxing function is enabled, only the third HDD 123 is driven. Therefore, the power consumption can be reduced, compared to driving the first HDD 121 having a large storage capacity to store the scanned data, print data, or facsimile data.

Second Modified Embodiment

In contrast to MFP 1 of the first modified embodiment described above, where a single predetermined HDD is driven among the first to third HDDs 121, 122 and 123 corresponding to a particular function to process image data, an MFP 1 of a second modified embodiment drives a single HDD, among the first to third HDDs 121, 122 and 123, which is predetermined corresponding to the data amount of the image data to be processed by MFP 1.

Referring to FIG. 7, there is shown a third flow chart illustrating an exemplary HDD drive controlling procedure. As shown in FIG. 7, CPU 111 determines whether or not data is acquired (step S81). If the data is acquired, the process proceeds to step S82. If the data is not acquired, the process proceeds to step S99. The term "data" is used here to include scanned data, print data, and facsimile data. In step S82, it is determined whether or not the data amount of the acquired data exceeds a first threshold value. If the data amount exceeds the first threshold value, the process proceeds to step S83. If the data amount does not exceed the first threshold value, the process proceeds to step S88. The processings executed in steps S83-S87 are identical to those in steps S32-S36 of FIG. 4, and the description thereof will not be repeated. The process proceeds to step S99 when it is determined that the first HDD 121 is in operation in step S83, when it is determined that neither the second HDD 122 nor the third HDD 123 is in operation in step S85, or after the step S87 is executed. As a result, only the first HDD 121 will be in operation.

In step S88, it is determined whether or not the data amount of the acquired data exceeds a second threshold value which is smaller than the first threshold value. If the data amount exceeds the second threshold value, the process proceeds to step S89. If the data amount does not exceed the second threshold value, the process proceeds to step S94. Specifically, if the data amount of the acquired data is larger than the second threshold value, but not more than the first threshold value, the process proceeds to step S89. The processings executed in steps S89-S93 are identical to those in steps S39-S42 of FIG. 4 and will not be repeated. The process proceeds to step S99 when it is determined that the second HDD 122 is in operation in step S89, when it is determined that neither the first HDD 121 nor the third HDD 123 is in operation in step S91, or after step S93 is executed. As a result, only the second HDD 122 will be in operation.

The process proceeds to step S94 when the data amount of the acquired data is not more than the second threshold value. The processings executed in steps S94-S98 are identical to those in steps S43-S47 of FIG. 4, and the description thereof will not be repeated. The process proceeds to step S99 when it is determined that the third HDD 123 is in operation in step S94, when it is determined that neither the first HDD 121 nor the second HDD 122 is in operation in step S96, or after step S98 is executed. As a result, only the third HDD 123 will be in operation.

In step S99, the searching procedure as shown in FIG. 5 is executed. When the process proceeds to step S99, if the data amount is larger than the first threshold value, the search data file stored in the second and third HDDs 122 and 123, respectively, has been transferred to and stored in the first HDD 121 before suspending the second and third HDDs 122 and 123. Therefore, even when the second and third HDDs 122 and 123 are currently not in operation, it is possible to identify which of the first to third HDDs 121, 122 and 123 stores the data, according to the search data file stored in the first HDD 121. Also, if the data amount is larger than the second threshold value, but not more than the first threshold value, the search data file stored in the first and third HDDs 121 and 123 has been transferred to and stored in the second HDD 122 before suspending the first and third HDDs 121 and 123. Therefore, even when the first and third HDDs 121 and 123 are currently not in operation, it is possible to identify which of the first to third HDDs 121, 122 and 123 stores the data, according to the search data file stored in the second HDD 122. Similarly, if the data amount is not more than the second threshold value, the search data file stored in the first and second HDDs 121 and 122, respectively, has been transferred to and stored in the third HDD 123 before suspending the first and second HDDs 121 and 122. Therefore, even when the first and second HDDs 121 and 122 are currently not in operation, it is possible to identify which of the first to third HDDs 121, 122 and 123 stores the data, according to the search data file stored in the third HDD 123.

In the next step S100, it is determined whether or not MFP 1 is turned off. When the power is turned off, the process ends, otherwise the process returns to step S81.

As described above, MFP 1 of the second modified embodiment associates the first to third HDDs 121, 122 and 123 with the data amount of the image data to be processed. Specifically, the first HDD 121 is associated with the data amount exceeding the first threshold value, the second HDD 122 is associated with the data amount exceeding the second threshold value, but not more than the first threshold value, and the third HDD 123 is associated with the data amount not more than the second threshold value. Only a single HDD that is associated with the data amount of the acquired data to be processed will be driven among the first to third HDDs 121, 1221 and 123. Therefore, the power consumption can be reduced, compared to driving the first HDD 121 having a large storage capacity.

Third Modified Embodiment

In contrast to MFP 1 of the second modified embodiment described above, where a single predetermined HDD is driven among the first to third HDDs 121, 122 and 123 corresponding to the data amount of the image data to be processed by MFP 1, an MFP 1 of a third modified embodiment drives a single HDD, among the first to third HDDs 121, 122 and 123, which consumes the least amount of power to record the image data.

Referring to FIGS. 8 and 9, there is shown a fourth flow chart illustrating an exemplary HDD drive controlling procedure. As shown in FIGS. 8 and 9, CPU 111 determines whether or not the data is acquired (step S101). If the data is acquired, the process proceeds to step S102. If the data is not acquired, the process proceeds to step S127. In step S102, it is determined whether or not the data amount of the acquired data is not more than a second threshold value. If the data amount is not more than the second threshold value, the process proceeds to step S103. If the data amount exceeds the second threshold value, the process proceeds to step S104. In step S103, the first to third HDDs 121, 122 and 123 are determined as candidate HDDs to be driven.

In step S104, it is determined whether or not the data amount of the acquired data is not more than the first threshold value. If the data amount is not more than a first threshold value, the process proceeds to step S105. If the data amount exceeds the first threshold value, the process proceeds to step S106. The first threshold value is greater than the second threshold value. Specifically, if the data amount of the acquired data is larger than the second threshold value, but note more than the first threshold value, the process proceeds to step S105. In step S105, the first and second HDDs 121 and 122 are determined as candidate HDDs to be driven. Then, the process proceeds to step S109.

In step S106, it is determined whether or not the data amount of the acquired data is not more than a third threshold value. If the data amount is not more than the third threshold value, the process proceeds to step S107. If the data amount exceeds the third threshold value, the process proceeds to step S108. The third threshold value is greater than the first threshold value. Specifically, if the data amount of the acquired data exceeds the first threshold value, but not more than the third threshold value, the process proceeds to step S107. If the data amount exceeds the third threshold value, the process proceeds to step S108. In step S107, the first HDD 121 is determined as a candidate HDD to be driven, and the process proceeds to step S109. In step S108, no candidate HDD to be driven is set, and the process proceeds to step S109. In the following, a HDD (or HDDs) determined as a candidate (or candidates) to be driven is referred to as a candidate HDD (or HDDs).

In step S109, the power consumption of the first to third HDDs 121, 122 and 123, respectively, is calculated. It is assumed herein to calculate the amount of power to be consumed to store the image data acquired in step S101. The power consumption varies depending on whether or not each HDD is in operation. For example, if the first HDD 121 is in operation, the power consumption calculated in step S109 is the amount of power to be consumed for the first HDD 121 to write the image data. In contrast, if the first HDD 121 is not in operation, the amount of power to be consumed from the start of rotation of the disc till the disc is ready for writing the image data will be added to the power consumption to write the image data. It is also assumed herein that the amount of power to be consumed per unit time for the first to third HDDs 121, 122 and 123 to write the image data is represented by WP1, WP2 and WP3 (Wh), respectively; the necessary time for the first to third HDDs 121, 122 and 123 to write the image data is represented by t1, t2 and t3 (seconds), respectively; and the amount of power to be consumed from the suspended state till the ready state where the image data is ready for writing is indicated by P1, P2 and P3 (Wh), respectively. The power consumption W1 (Wh) of the first HDD 121 is calculated by $W1=WP1\times t1/3600+P1$, where $P1=0$ if the first HDD 121 is in operation. The power consumption W2 (Wh) of the second HDD 122 is calculated by $W2=WP2\times t2/3600+P2$, where $P2=0$ if the second HDD 122 is in operation. The power consumption W3 (Wh) of the third HDD 123 is calculated by $W3=WP3\times t3/3600+P3$, where $P3=0$ if the third HDD 123 is in operation.

In step S110, it is determined whether or not the first to third HDDs 121, 122 and 123 are determined as candidate HDDs. If all of the first to third HDDs 121, 122 and 123 are determined as the candidate HDDs, the process proceeds to step S111, otherwise the process proceeds to step S114. In step S111, it is determined whether or not the third HDD 123 consumes the least amount of power. If the third HDD 123 consumes the least amount of power, the process proceeds to step S112. If the third HDD 123 does not consume the least amount of power, the process proceeds to step S113. In step S112, the third HDD 123 is determined as the HDD to be driven and the process proceeds to step S114. In the meantime, in step S113, the first and second HDDs 121 and 122 are determined as candidate HDDs, and the process proceeds to step S114.

In step S114, it is determined whether or not the first and second HDDs 121 and 122 are determined as candidate HDDs. If both of the first and second HDDs 121 and 122 are determined as candidate HDDs, the process proceeds to step S115, otherwise the process proceeds to step S118. In step S115, it is determined whether or not the second HDD 122 consumes the least amount of power. If the second HDD 122 consumes the least amount of power, the process proceeds to step S116. If the second HDD 122 does not consume the least amount of power, the process proceeds to step S117. In step S116, the second HDD 122 is determined as the HDD to be driven and the process proceeds to step S118. In the meantime, in step S117, the first HDD 121 is determined as the HDD to be driven, and the process proceeds to step S118.

In step S118, it is determined whether or not the first HDD 121 is determined as the candidate HDD. If the first HDD 121 is determined as the candidate HDD, the process proceeds to step S119, otherwise the process proceeds to step S120. In step S119, the first HDD 121 is determined as the HDD to be driven and the process proceeds to step S121. In the meantime, in step S120, no HDD is determined to be driven and the process proceeds to step S121.

In step S121, it is determined whether or not any HDD has been determined to be driven among the first to third HDDs 121, 122 and 123. If at least one HDD is determined to be driven, the process proceeds to step S122. If no HDD has been determined to be driven, the process proceeds to step S126. In step S126, an error is output. For example, error messages, such as "Too Large Data Size. Unable to Store." will be displayed on display unit 114.

In step S122, the HDD determined to be driven among the first to third HDDs 121, 122 and 123 will be driven. Subsequently, it is determined whether or not any HDD other than the driven HDD is in operation among the first to third HDDs 121, 122 and 123 (step S123). If any HDD other than the driven HDD is in operation, the process proceeds to step S124, otherwise the process proceeds to step S127. In step S124, the search data file stored in the active HDD(s) other than the driven HDD among the first to third HDDs 121, 122 and 123 is transferred to and stored in the HDD driven in step S122. The search data file transferred to the driven HDD includes the search data file to search through the data stored in the HDD(s) other than the driven HDD. Subsequently, the active HDD(s) other than the driven HDD is suspended (step S125). As a result, only the driven HDD will be in operation.

In step S127, the searching procedure as shown in FIG. 5 is executed and the process proceeds to step S128. When the process proceeds to step S127, only a single HDD among the first to third HDDs 121, 122 and 123 is driven, and the search data file to search through the data, that has been previously stored in any HDD other than the driven HDD among the first to third HDDs 121, 122 and 123, has been transferred to and stored in the driven HDD, before suspending the any HDD that was in operation till the single HDD is driven. With the search data file stored in the single HDD that is currently in operation, it is still possible to search through the data previously stored in any of the first to third HDDs 121, 122 and 123, although only one HDD is in operation. In step S128, it is determined whether or not MFP 1 is turned off. When the power is turned off, the process ends, otherwise the process returns to step S101.

In the following, a particular example where the image data having the data amount of 60 MB, which is less than the second threshold value, is input to MFP 1 will be described. Assuming that the data writing speed is 30 (MB/seconds) for all of the first to third HDDs 121, 122 and 123, the necessary time to write the data will be two seconds. Assuming that the power consumption per unit time WP1 for the first HDD 121 to write the data is 3.5 (W), and the power to be consumed P1 by the first HDD 121 from the suspended state thereof till it is ready for writing the image data is 1.944 (mWh); the power consumption per unit time WP2 for the second HDD 122 to write the data is 2 (W), and the power to be consumed P2 by the second HDD 122 from the suspended state thereof till it is ready for writing the image data is 0.972 (mWh); and the power consumption per unit time WP3 for the third HDD 123 to write the data is 1 (W), and the power to be consumed P3 by the third HDD 123 from the suspended state thereof till it is ready for writing the image data is 0.694 (mWh).

When none of the first to third HDDs 121, 122 and 123 is in operation, the power to be consumed for individual HDDs to write the image data will be calculated as follows: W1 (the power consumption of the first HDD 121)=3.5 (W)×2 (seconds)/3600 (seconds)+1.944 (mWh)=3.889 (mWh); W2 (the power consumption of the second HDD 122)=2 (W)×2 (seconds)/3600 (seconds)+0.972 (mWh)=2.083 (mWh); and W3 (the power consumption of the third HDD 123)=1 (W)×2 (seconds)/3600 (seconds)+0.694 (mWh)=1.25 (mWh). As a result, W3 will consume the least amount of power. In this case, the third HDD 123 will be determined as the HDD to be driven when the data amount of the image data is not more than the second threshold value.

When only the second HDD 122 is in operation among the first to third HDDs 121, 122 and 123, the power to be consumed by individual HDDs to write the image data will be calculated as follows: W1 (the power consumption of the first HDD 121)=3.5 (W)×2 (seconds)/3600 (seconds)+1.944 (mWh)=3.889 (mWh); W2 (the power consumption of the second HDD 122)=2 (W)×2 (seconds)/3600 (seconds)=1.111 (mWh); and W3 (the power consumption of the third HDD 123)=1 (W)×2 (seconds)/3600 (seconds)+0.694 (mWh) =1.25 (mWh). As a result, W2 will consume the least amount of power. In this case, the second HDD 122 will be determined as the HDD to be driven when the data amount of the image data is not more than the second threshold value.

As described above, MFP 1 of the third modified embodiment calculates the required power consumption necessary to store the image data for each HDD of the first to third HDDs 121, 122 and 123, if any of the first to third HDDs 121, 122 and 123 is in operation, and drives the storage device having the least calculated power consumption. Therefore, it is possible to minimize the power consumption.

It should be noted that although MFP 1 has been described in these embodiments, it is apparent that the present invention can be implemented as a method or a program to store image data to cause the computers to execute the procedures as illustrated in FIGS. 3-9.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
- a plurality of storage devices to store data, each storage device having a different storage capacity;
- a writing portion to write received data to one of said plurality of storage devices;
- an operating mode switching portion to change one operating mode for another operating mode among a plurality of operating modes, each operating mode being driven by a different load; and
- a controller to control driving of each of said plurality of storage devices,
- wherein said controller includes
- a selecting portion to select one storage device from said plurality of storage devices, said one storage device being predetermined in correspondence to the switched operating mode, and
- a drive controlling portion to drive said selected storage device, while suspending any storage device in operation other than said driven storage device.

2. An image processing apparatus according to claim 1, wherein
- said controller includes
- a search data generating portion to generate search data used for searching data stored in said any storage device in operation other than said driven storage device, before suspending said any storage device in operation, and
- a search data writing portion to write said generated search data to said driven storage device among said plurality of storage devices.

3. An image processing apparatus according to claim 2, wherein
- said controller includes
- a searching portion to start searching, when a search instruction is received, by using said search data stored in said storage device that is currently driven among said plurality of storage devices, and
- a drive-upon-search portion to drive a particular storage device among said plurality of storage devices determined by a search result.

4. An image processing apparatus having a plurality of functions, comprising:
- a plurality of storage devices to store data, each storage device provided corresponding to each of said plurality of functions; and
- a controller to control driving of each of said plurality of storage devices,
- wherein when one of said plurality of functions is enabled, said controller drives a particular storage device among said plurality of storage devices corresponding to said enabled function, while suspending any storage device in operation other than said driven storage device.

5. An image processing apparatus, comprising:
- a plurality of storage devices to store data, each storage device having a different storage capacity;
- a writing portion to write received data to one of said plurality of storage devices;

a data acquiring portion to acquire data;

a controller to control driving of each of said plurality of storage devices; and a power consumption calculating portion to calculate a power consumption needed for each of said plurality of storage devices to store said acquired data;

wherein said controller includes a selecting portion to select one storage device from said plurality of storage devices, according to said power consumption calculated by said power consumption calculating portion, when said data is acquired by said data acquiring portion, and a drive controlling portion to drive said selected storage device, while suspending any storage device in operation other than said driven storage device.

6. An image processing apparatus according to claim 5, wherein said controller includes a search data generating portion to generate search data used for searching data stored in said any storage device in operation other than said driven storage device, before suspending said any storage device in operation, and a search data writing portion to write said generated search data to said driven storage device among said plurality of storage devices.

7. An image processing apparatus according to claim 6, wherein said controller includes a searching portion to start searching, when a search instruction is received, by using said search data stored in said storage device that is currently driven among said plurality of storage devices, and a drive-upon-search portion to drive a particular storage device among said plurality of storage devices determined by a search result.

8. An image data storing method executed by an image processing apparatus having a plurality of storage devices to store data, each storage device having a different storage capacity, comprising the steps of:

writing received data to one of said plurality of storage devices;

changing one operating mode for another operating mode among a plurality of operating modes, each operating mode being driven by a different load;

controlling driving of each of said plurality of storage devices;

selecting one storage device from said plurality of storage devices, said selected storage device being predetermined corresponding to said switched operating mode;

driving said selected storage device; and suspending any storage device in operation other than said driven storage device.

9. A method of storing image data according to claim 8, wherein said controlling step includes generating search data used for searching data stored in any storage device in operation other than said driven storage device, before suspending said any storage device in operation, and writing said generated search data to said driven storage device among said plurality of storage devices.

10. An image data storing method according to claim 9, wherein said controlling step includes searching, when a search instruction is received, by using said search data stored in said storage device that is currently driven among said plurality of storage devices, and driving a particular storage device among said plurality of storage devices, according to a search result of said searching step.

11. An image data storing method executed by an image processing apparatus having a plurality of storage devices to store data, comprising the steps of:

enabling one of a plurality of functions;

in response to said one of the plurality of functions being enabled, driving a particular storage device among said plurality of storage devices corresponding to said enabled function; and suspending any storage device in operation other than said driven storage device.

12. An image data storing method executed by an image processing apparatus having a plurality of storage devices to store data, each storage device having a different storage capacity, comprising the steps of:

acquiring data;

calculating a power consumption needed for each of said plurality of storage devices to store said acquired data, when said data is acquired in said data acquiring step;

selecting one storage device from said plurality of storage devices according to said power consumption calculated in said power consumption calculating step;

driving said selected storage device;

suspending any storage device in operation other than said driven storage device; and writing said data acquired in said data acquiring step to said driven storage device.

13. An image data storing method according to claim 12, wherein said controlling step includes generating search data used for searching data stored in any storage device in operation other than said driven storage device, before suspending said any storage device in operation, and writing said generated search data to said driven storage device among said plurality of storage devices.

14. An image data storing method according to claim 13, wherein said controlling step includes searching by using said search data stored in said storage device that is currently driven among said plurality of storage devices, when a search instruction is received, and driving a particular storage device among said plurality of storage devices determined by said search result, according to a search result of said searching step.

* * * * *